(12) United States Patent (10) Patent No.: US 9,239,104 B2
Uchida et al. (45) Date of Patent: Jan. 19, 2016

(54) WELDED STRUCTURE AND WELDING METHOD

(75) Inventors: Keisuke Uchida, Nagoya (JP); Shingo Iwatani, Miyoshi (JP); Takahito Endo, Toyota (JP); Go Kuramoto, Hoi-gun (JP); Jun Kamitake, Toyota (JP); Hirokazu Tsunekawa, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 652 days.

(21) Appl. No.: 13/574,474

(22) PCT Filed: Jan. 22, 2010

(86) PCT No.: PCT/JP2010/050770

§ 371 (c)(1),
(2), (4) Date: Jul. 20, 2012

(87) PCT Pub. No.: WO2011/089704

PCT Pub. Date: Jul. 28, 2011

(65) Prior Publication Data

US 2012/0295125 A1 Nov. 22, 2012

(51) Int. Cl.
*B32B 7/04* (2006.01)
*B23K 11/00* (2006.01)
(Continued)

(52) U.S. Cl.
CPC ............. *F16H 55/17* (2013.01); *B23K 26/30* (2013.01); *B23K 33/00* (2013.01); *B23K 33/006* (2013.01);
(Continued)

(58) Field of Classification Search
CPC .............. B32B 1/01; B32B 1/04; B32B 3/02; B32B 3/06; B32B 3/26; B32B 15/012; B32B 15/04; B32B 15/00; B32B 15/18; Y10T 428/12347; Y10T 428/12361; Y10T 428/12375; Y10T 428/12333
USPC .......... 428/594, 598, 596, 603, 615, 682, 683
See application file for complete search history.

(56) References Cited

U.S. PATENT DOCUMENTS 5,806,373 A 9/1998 Parker
6,193,137 B1 2/2001 Ezumi et al.
(Continued)

FOREIGN PATENT DOCUMENTS

CN 1212194 A 3/1999
EP 1 719 572 A2 11/2006
(Continued)

OTHER PUBLICATIONS

Notice of Allowance mailed Apr. 23, 2014 in U.S. Appl. No. 13/264,201.
International Search Report of PCT/JP2010/050770 mailed Apr. 27, 2010.
Office Action dated Nov. 4, 2013 in U.S. Appl. No. 13/264,201.

*Primary Examiner* — Michael E La Villa
(74) *Attorney, Agent, or Firm* — Kenyon & Kenyon LLP

(57) ABSTRACT

A welded structure has a first member and a second member that are welded together. The first member comprises a second-member joining part, and the second member comprises a first-member joining part. If the direction in which the first member and the second member are arranged is the first direction, and the direction intersecting the first direction is the second direction, welded parts are provided at least at both ends in the second direction of the joining surface where the first member and the second member are joined. The first member is such that the second-member joining part and a linking part which connects to the second-member joining part are arranged in succession from the joining surface in the first direction, and the dimensions of the second-member joining part are greater than the dimensions of the linking part in a third direction perpendicular to the first direction.

13 Claims, 12 Drawing Sheets

(51) Int. Cl.
- *B32B 15/00* (2006.01)
- *B23K 33/00* (2006.01)
- *F16H 55/17* (2006.01)
- *B32B 1/04* (2006.01)
- *B32B 3/02* (2006.01)
- *B32B 3/06* (2006.01)
- *B32B 3/26* (2006.01)
- *B32B 15/01* (2006.01)
- *B32B 15/04* (2006.01)
- *B32B 15/18* (2006.01)
- *B23K 26/30* (2014.01)
- *F16H 48/38* (2012.01)

(52) U.S. Cl.
CPC ... *B32B 1/04* (2013.01); *B32B 3/02* (2013.01); *B32B 3/06* (2013.01); *B32B 3/26* (2013.01); *B32B 15/00* (2013.01); *B32B 15/012* (2013.01); *B32B 15/04* (2013.01); *B32B 15/18* (2013.01); *F16H 2048/382* (2013.01); *F16H 2048/385* (2013.01); *Y10T 428/12333* (2015.01); *Y10T 428/12347* (2015.01); *Y10T 428/12361* (2015.01); *Y10T 428/12375* (2015.01)

(56) References Cited

U.S. PATENT DOCUMENTS

| | | | |
|---|---|---|---|
| 6,527,470 | B2 | 3/2003 | Ezumi et al. |
| 8,002,167 | B2 | 8/2011 | Zuber et al. |
| 2001/0007717 | A1 | 7/2001 | Ezumi et al. |
| 2002/0081148 | A1 | 6/2002 | Ezumi et al. |
| 2002/0081149 | A1 | 6/2002 | Ezumi et al. |
| 2007/0007321 | A1* | 1/2007 | Ezumi et al. ............... 228/112.1 |
| 2012/0094798 | A1 | 4/2012 | Uchida et al. |
| 2012/0325047 | A1 | 12/2012 | Cripsey |

FOREIGN PATENT DOCUMENTS

| | | |
|---|---|---|
| JP | 62-038787 A | 2/1987 |
| JP | 314066 U | 2/1991 |
| JP | 07-284926 A | 10/1995 |
| JP | 8-1327 A | 1/1996 |
| JP | 10-113783 A | 5/1998 |
| JP | 10-231918 A | 9/1998 |
| JP | 2002-514511 A | 5/2002 |
| JP | 2005-081351 A | 3/2005 |
| JP | 2009226643 A | 8/2009 |
| JP | 2009250339 A | 10/2009 |
| JP | 2011167746 A | 1/2011 |
| WO | 2011089704 A1 | 7/2011 |

* cited by examiner

WELDED STRUCTURE AND WELDING METHOD

CROSS-REFERENCE TO RELATED APPLICATIONS

This is a 371 national phase application of PCT/JP2010/050770 filed on 22 Jan. 2010, the entire contents of which are incorporated herein by reference.

TECHNICAL FIELD

The present invention relates to a welded structure of plural parts joined together by welding such as, for example, a differential case and a ring gear of a differential device (differential gear) of an automobile, and a welding method.

BACKGROUND ART

One example of a welded structure of plural parts joined together by welding is a welded structure between, for example, a differential case and a ring gear of a differential device (hereinafter, "differential gear") of an automobile. FIG. 11 shows a conventional example of a welded structure between a conventional differential case 100 and a ring gear 102. A hypoid gear is formed in the teeth portion 102a of the ring gear 102. In the conventional example of FIG. 11, a groove 104 is provided in the joint surface between the differential case 100 and the ring gear 102. This reduces the compressive stress on a weld bead 105 and concentration of shear stress on a weld bead end 105a caused by a load applied in directions shown in the drawing in actual operation of the differential gear.

However, in a conventional example in which a helical gear is formed in a teeth portion 106a of a ring gear 106 as shown in FIG. 12, the load is applied repeatedly in respective directions indicated by solid line arrows and broken line arrows in actual operation of the differential gear. This causes compressive stress and tensile stress to be generated repeatedly at both ends, in the center axis direction, of the ring gear 106 (up and down direction of the drawing) of the joint surface between a differential case 108 and the ring gear 106. In the conventional example of FIG. 12, a weld bead 109 is formed only from one side in the center axis direction of the ring gear 106 of the joint surface between the differential case 108 and the ring gear 106. Therefore one end of the weld bead 109 may be repeatedly subjected to large compressive and tensile stresses, which may result in insufficient weld strength. Even if a groove 110 is provided in the differential case 108 in its joint surface with the ring gear 106, such groove cannot provide an effect of reducing stresses applied to the end on the groove 110 side of the weld bead 109.

Patent Document 1 discloses a technique in which a flange member is disposed between a small gear wheel member and a large gear wheel member, and the flange member is joined to the large gear wheel member with the outer periphery of the flange member being in contact with the inner periphery of the large gear wheel member such that it is welded from both sides in the center axis direction of the large gear wheel member.

RELATED ART DOCUMENTS

Patent Documents

Patent Document 1: JP10(1998)-231918A

DISCLOSURE OF THE INVENTION

Problems to be Solved by the Invention

In the technique of Patent Document 1, where a helical gear is formed in the teeth portion of the large gear wheel member, the compressive and tensile stresses are repeatedly generated at the ends of both weld beads. However, if the large gear wheel member has a low bending rigidity, the weld strength may turn out to be insufficient. Also, when welding the large gear wheel member from both sides in the center axis direction thereof, much of the gas generated during welding inside the weld beads remains inside the weld beads. Therefore, there is a possibility of blow holes being formed due to much of the gas remaining inside the weld beads after the welding. Accordingly, the weld quality may be compromised.

Accordingly, the present invention was devised to solve the above problems, and its object is to provide a welded structure and a welding method with which weld strength and weld quality can be improved.

Means of Solving the Problems

One aspect of the present invention for solving the above problems is a welded structure of a first member and a second member joined together by welding, wherein the first member includes a second-member joint portion joined to the second member, the second member includes a first-member joint portion joined to the first member, assuming that the first member and the second member are arranged in a first direction, and a second direction intersects with the first direction, welds are formed at least at both ends, in the second direction, of a joint surface where the first-member joint portion and the second-member joint portion are joined together, the first member includes the second-member joint portion and a connecting portion connected to the second-member joint portion, arranged sequentially from the joint surface along the first direction, the second-member joint portion is formed to have a larger size than that of the connecting portion in a third direction orthogonal to the first direction.

With this aspect, the bending rigidity of the second-member joint portion is improved so that the stress applied to the welds is reduced, whereby weld strength is improved.

Also, due to a reduction in heat capacity and a decrease in rigidity in a portion protruded from the connecting portion of the second-member joint portion, this protruded portion can expand and contract more readily in response to temperature changes. This suppresses formation of cracks in the welds during welding, whereby weld quality is improved.

The joint surface includes a surface formed by connecting a plurality of surfaces oriented in different directions.

As one aspect of the present invention, preferably, an external force is applied to the first member or the second member in a direction parallel to the third direction.

With this aspect, if the design is such that an external force is applied in a direction parallel to the third direction, then it means that the second-member joint portion is formed to have a larger size than that of the connecting portion in a direction parallel to the direction in which the external force is applied. Therefore the second-member joint portion will have an improved bending rigidity against a bending moment, whereby weld strength is definitely improved.

Further, with the section modulus of the second-member joint portion being increased, weld strength can be secured without making the penetration depth of the welds very large. Heat input during welding is thereby reduced, and therefore weld distortion and welding equipment cost can be reduced.

As one aspect of the present invention, preferably, the second-member joint portion has a smaller size than that of the first-member joint portion in the third direction.

With this aspect, weld wire can be fed to conform to a step between the second-member joint portion and the first-member joint portion during welding so as to prevent displacement of the weld wire.

As one aspect of the present invention, preferably, at least one of both end faces of the second-member joint portion in the third direction is formed flat along the first direction.

With this aspect, a positioning jig can be abutted on the end face formed flat to position the first member, so that positioning accuracy is improved.

As one aspect of the present invention, it is preferable that the welded structure includes a cavity between the first-member joint portion and the second-member joint portion, and the welds are provided respectively between both ends of the joint surface in the second direction and the cavity.

With this aspect, gas that may be generated during welding can be exhausted into the cavity, so that formation of blow holes is suppressed. Also, stress that may act to lower weld strength hardly remains at the interface of a joint portion between the first member and the second member in cooling after welding, so that weld strength and weld quality are improved.

As one aspect of the present invention, it is preferable that the first member or the second member includes a through hole extending from outside into the cavity.

With this aspect, gas exhausted into the cavity during welding can escape from the through hole so that formation of pin holes in the weld (welded portion) is prevented. The through hole also allows for observation of the inside of the cavity to check if the weld has been formed through to the cavity, so that weld quality is improved. Also, any droplets due to possible condensation inside the cavity in cooling after welding can be drained from the through hole, so that corrosion of the weld can be prevented.

As one aspect of the present invention, preferably, the second member is made of a material that generates more gas when the second member is melted than the first member, and the welds are each formed along a direction inclined toward the first member side relative to the joint surface.

With this aspect, the melting amount of the second member that generates more gas when melted can be reduced during welding, so that formation of blow holes is suppressed.

As one aspect of the present invention, preferably, the first member is an annular member with its radial direction coinciding with the first direction and its center axis direction coinciding with the third direction.

With this aspect, weld strength and weld quality of the welding of the first member that is an annular member and the second member are improved.

As one aspect of the present invention, preferably, the first member includes a non-joint portion connected to an outer circumference of the connecting portion in the radial direction, the second-member joint portion having a smaller size than that of the non-joint portion in the center axis direction.

With this aspect, stirring resistance between a fluid existing around the first member and the first member generated when the first member rotates can be reduced. Also, the first member can be reduced in weight.

As one aspect of the present invention, it is preferable that a press-fit portion is formed on one of an inner peripheral surface of the first member and an abutment surface of the first-member joint portion of the second member that abuts against the inner peripheral surface for allowing a press-fit to be made with an allowance between the inner peripheral surface and the abutment surface.

With this aspect, the second member is press-fitted into the first member, or, the first member is press-fitted into the second member, so that the first member and the second member are maintained in their positions during welding. Therefore, weld distortion can be reduced. Further, when performing welding, for example laser welding, from both ends in the second direction of the joint surface, i.e., from two directions, the irradiated laser beam is interrupted by the press-fit portion. Therefore the weld already formed by a laser beam irradiated from one side can be prevented from being re-heated by a laser beam irradiated from the other side. Also, even when welding is performed simultaneously from the above-noted two directions, the laser beams irradiated from the two directions do not interfere with each other.

As one aspect of the present invention, preferably, the first member is a ring gear of a differential gear, and the second member is a differential case that is a housing member of the differential gear.

With this aspect, stress applied to the welds caused by an external force on the ring gear in actual operation of the differential gear is reduced, and also, formation of cracks near the welds and blow holes in the welds can be suppressed. Thus, weld strength and weld quality of the weld between the differential case and the ring gear are improved.

To achieve the above purpose, one aspect of the present invention provides a welding method for joining a first member and a second member together by welding, wherein assuming that the first member and the second member are arranged along a first direction for joining together a second-member joint portion of the first member to be joined to the second member and a first-member joint portion of the second member to be joined to the first member, and a second direction intersects with the first direction, the first member is formed to have the second-member joint portion and a connecting portion connected to the second-member joint portion arranged sequentially from a joint surface where the first-member joint portion and the second-member joint portion are joined together along the first direction, with the second-member joint portion having a larger size than that of the connecting portion in a third direction orthogonal to the first direction, and welding is performed from both ends of the joint surface in the second direction to form welds at least at both ends of the joint surface in the second direction.

As one aspect of the present invention, preferably, the second-member joint portion has a smaller size than that of the first-member joint portion in the third direction so that a step is formed between the first-member joint portion and the second-member joint portion, and welding is performed with weld wire being fed to conform to the step.

As one aspect of the present invention, preferably, at least one of both end faces of the second-member joint portion in the third direction is formed flat along the first direction, and positioning of the first member is performed by abutting a jig on the end face formed flat.

Effects of the Invention

According to the welded structure and the welding method of the invention, it is possible to improve weld strength and weld quality.

MODE FOR CARRYING OUT THE INVENTION

Hereinafter, embodiments of the present invention will be described in detail with reference to the accompanying drawings. In this embodiment, a welded structure between a differential case and a ring gear in a differential gear will be described as one example.

Example 1

First, the overall welded structure of this example will be described.

Figure 1:
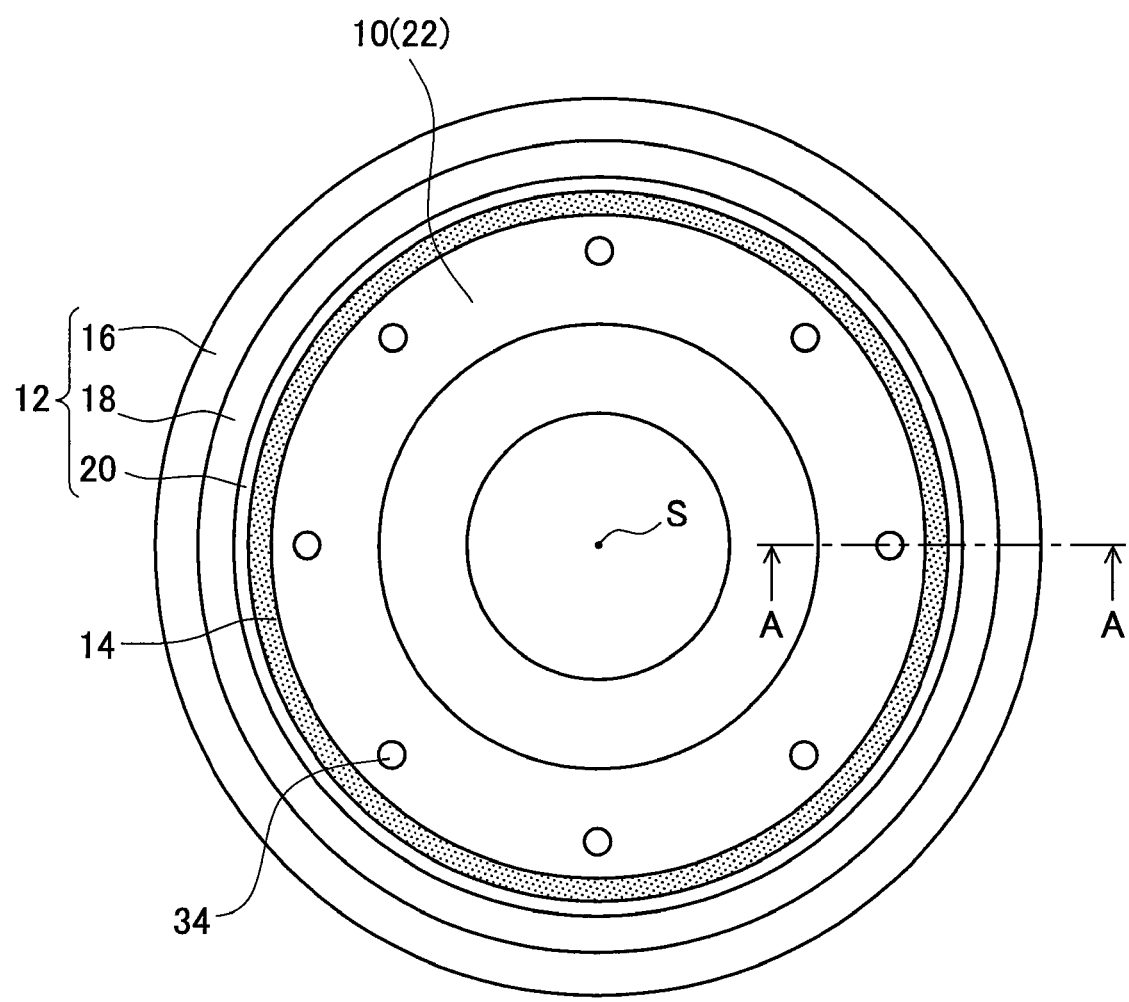
FIG. 1 is a plan view of a welded structure between a differential case and a ring gear.

FIG. 1 is a plan view of the welded structure between a differential case 10 and a ring gear 12, the differential case 10 being shown partially, i.e., only the vicinity of its joint portion to the ring gear 12 being shown.

As shown in FIG. 1, the differential case 10 and the ring gear 12 are joined by welding, with the differential case 10 being inserted into the inner periphery of the annular ring gear 12. A first weld bead 14, which is a weld (a welded portion) formed when joining the differential case 10 and the ring gear 12 by welding, is formed in an annular shape along the inner periphery of the ring gear 12. Here, the differential case 10 is one example of a "second member" in the claims. The ring gear 12 is one example of a "first member" in the claims. In this example, welding is performed from two directions on both sides of the ring gear 12 in a direction of a center axis S of the ring gear 12 (in a direction perpendicular to the paper plane of FIG. 1, a direction orthogonal to the radial direction of the ring gear 12). As will be described later, a second weld bead 38 (see FIG. 3) which is a weld (a welded portion) on the opposite side from the side shown in FIG. 1 is formed in an annular shape along the inner periphery of the ring gear 12 similarly to the first weld bead 14.

The differential case 10 is a housing member accommodating therein components for transmitting power (such as a pinion shaft, pinion gear, side gear, etc.) to a drive shaft (not shown). The ring gear 12 is a gear wheel member meshing with a drive pinion (not shown) that transmits power from an engine (not shown). The differential case 10 is made of cast iron, while the ring gear 12 is made of steel.

Figure 2:
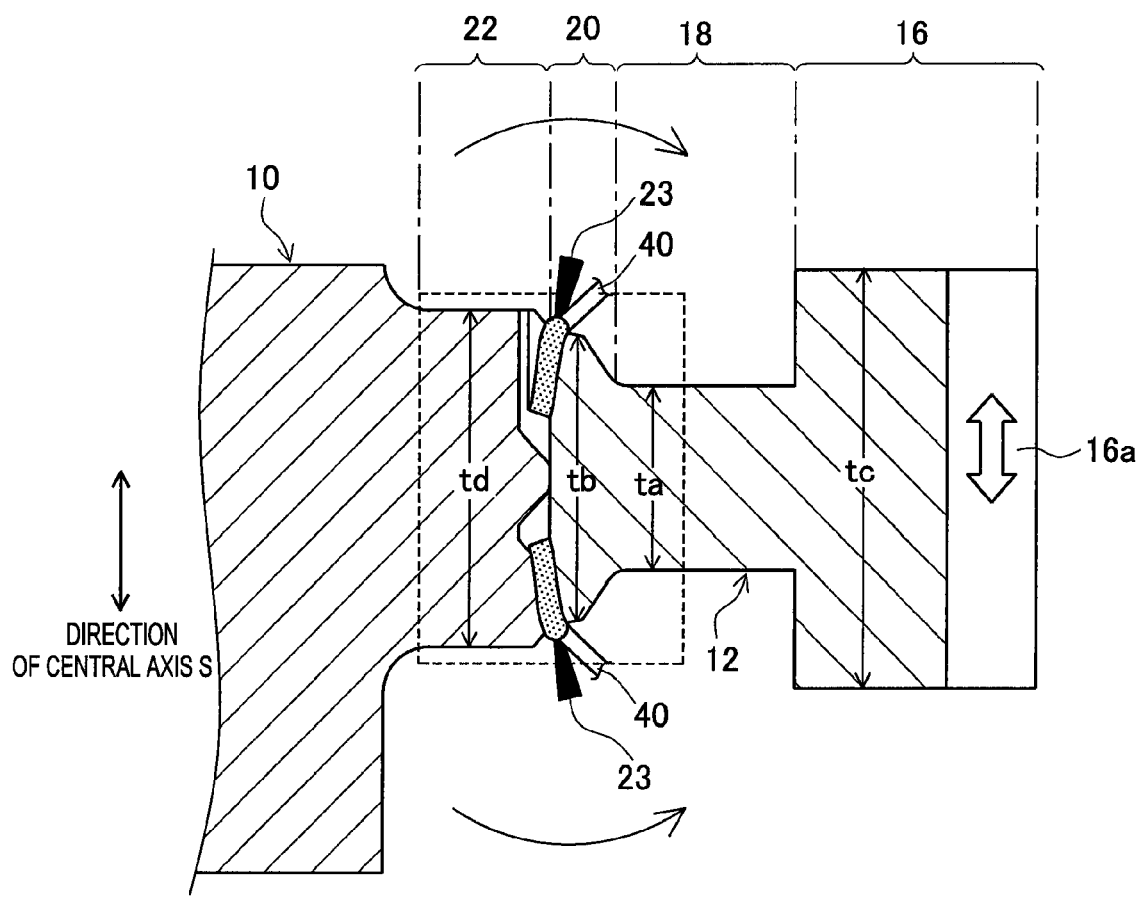
FIG. 2 is a cross-sectional view along A-A of FIG. 1.
Figure 3:
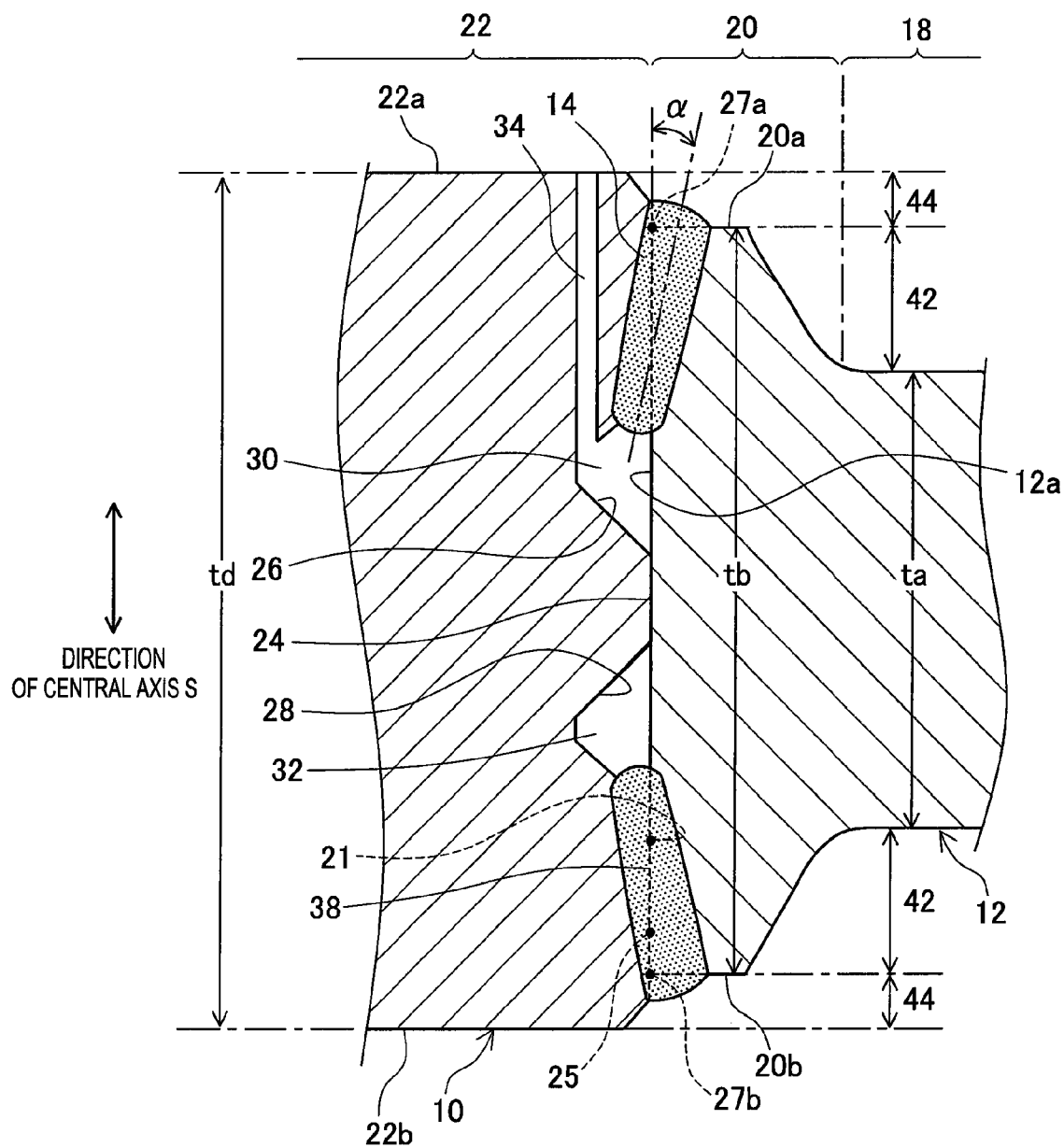
FIG. 3 is an enlarged view of a joint portion between the differential case and the ring gear in FIG. 2.

FIG. 2 is a cross-sectional view along A-A of FIG. 1, and FIG. 3 is an enlarged view of the joint portion between the differential case 10 and the ring gear 12 in FIG. 2.

As shown in FIG. 2 and FIG. 3, the differential case 10 and the ring gear 12 are aligned in the radial direction (first direction) of the ring gear 12. The center axis S direction of the ring gear 12 is the direction orthogonal to the radial direction of the ring gear 12 (third direction). In this example, the direction in which the first weld bead 14 and the second weld bead 38 are formed in a joint surface 25 (second direction) coincides with the direction orthogonal to the radial direction of the ring gear 12 (third direction, or center axis S direction).

The differential case 10 is provided with a gear joint portion 22 which will be joined to the ring gear 12. Here, the gear joint portion 22 is one example of a "first-member joint portion" in the claims, and a part of the differential case 10. Namely, the "first-member joint portion" in the claims is a part of the "second member". The ring gear 12 is provided with a case joint portion 20 which will be joined to the differential case 10. Here, the case joint portion 20 is one example of a "second-member joint portion" in the claims, and a part of the ring gear 12. Namely, the "second-member joint portion" in the claims is a part of the "first member". In the joint surface 25 where the case joint portion 20 and the gear joint portion 22 are joined together, the first weld bead 14 is formed from one end 27a, while the second weld bead 38 is formed from the other end 27b, of both ends of the ring gear 12 in the center axis S direction.

The ring gear 12 is formed by the case joint portion 20, a connecting portion 18, and a toothed portion 16 arranged in this order along the radial direction from the joint surface 25 toward the outer periphery of the ring gear 12. The connecting portion 18 connects to the case joint portion 20 and the toothed portion 16, i.e., couples the case joint portion 20 and the toothed portion 16. The toothed portion 16 is formed with a teeth portion 16a on its outer periphery. In this example, a helical gear is formed in the teeth portion 16a.

As shown in FIG. 3, the gear joint portion 22 of the differential case 10 is provided with an abutment surface 21 to be abutted against an inner peripheral surface 12a of the ring gear 12 before welding the differential case 10 and the ring gear 12 together. This abutment surface 21 includes a press-fit portion 24 and a first groove 26 and a second groove 28 on both sides of this press-fit portion 24.

The press-fit portion 24 is provided substantially at the center in the center axis S direction of the ring gear 12 of the abutment surface 21. This press-fit portion 24 is provided for allowing the differential case 10 and the ring gear 12 to make a press-fit with each other with an allowance between the inner peripheral surface 12a and the abutment surface 21 when inserting the differential case 10 into the inner peripheral surface 12a of the ring gear 12. Alternatively, surface portions located on both sides of the ring gear 12 in the center axis S direction across the first groove 26, the press-fit portion 24, and the second groove 28 of the abutment surface 21 may serve as the press-fit portion. The first groove 26 and the second groove 28 respectively form a first cavity 30 and a second cavity 32 between themselves and the inner peripheral surface 12a of the ring gear 12. Instead of providing the press-fit portion 24 to the abutment surface 21 of the differential case 10, a press-fit portion may be provided to the inner peripheral surface 12a of the ring gear 12.

The gear joint portion 22 of the differential case 10 is formed with through holes 34 extending from outside the differential case 10 into the first cavity 30. Additional through holes extending from outside the differential case 10 into the second cavity 32 may also be provided. Alternatively, through holes may be formed in the case joint portion 20 of the ring gear 12 instead of, or in addition to the through holes in the gear joint portion 22 of the differential case 10.

In this example, welding is performed from two directions on both sides of the ring gear 12 in the center axis S direction, thereby forming the first weld bead 14 and the second weld bead 38, respectively. The first weld bead 14 and the second weld bead 38 are layers of welded metal deposited in the joined portion of the gear joint portion 22 of the differential case 10 and the case joint portion 20 of the ring gear 12 when they are joined together by welding.

The first weld bead 14 is formed between one end 27a of the joint surface 25 in the center axis S direction and the first cavity 30, while the second weld bead 38 is formed between one end 27b of the joint surface 25 in the center axis S direction and the second cavity 32. The first weld bead 14 and the second weld bead 38 are formed along directions inclined at an angle a relative to the abutment surface 21 of the gear joint portion 22 of the differential case 10.

The overall welded structure of this example is as described above.

Next, the characteristic features and advantageous effects of the welded structure of this example will be explained.

As shown in FIG. 2 and FIG. 3, in the center axis S direction of the ring gear 12, the dimension of the connecting portion 18 is denoted by ta, the dimension between an end face 20a and an end face 20b of the case joint portion 20 is denoted by tb, and the dimension of the toothed portion 16 is denoted by tc.

In the differential gear having the welded structure between the differential case 10 and the ring gear 12 of this example, a thrust load (external force) is applied to the toothed portion 16 in the center axis S direction of the ring gear 12 (in a direction indicated by a thick arrow in FIG. 2) by power transmission from a drive pinion (not shown) in actual operation. When a bending moment is applied in directions indicated by thin arrows in FIG. 2 because of such a thrust load, the first weld bead 14 and the second weld bead 38 are subjected to compressive stress or tensile stress.

In this example, ta<tb. Therefore, the case joint portion 20 has an increased section modulus and an improved bending rigidity. Because of this, despite the thrust load acting in the center axis S direction, the compressive and tensile stresses applied to the first weld bead 14 and the second weld bead 38 are reduced. Thus, by making the dimensions ta<tb, weld strength between the differential case 10 and the ring gear 12 is improved.

Because ta<tb, as shown in FIG. 3, the case joint portion 20 of the ring gear 12 has a protruded portion 42 extending out from the connecting portion 18 in the center axis S direction of the ring gear 12. Since the protruded portion 42 has a small dimension in the radial direction of the ring gear 12 and has an open or exposed surface on the opposite side from the joint surface 25 in the radial direction of the ring gear 12, this protruded portion 42 has a small heat capacity and low rigidity. In welding at the joint surface 25, therefore, as the temperature rises and its Young's modulus lowers, the protruded portion 42 can readily deform with expansion thereof as indicated by a broken line in a direction of an arrow in FIG. 4.

The protruded portion 42 can also deform with contraction thereof as the temperature falls in cooling after welding. Therefore, formation of cracks in the first weld bead 14 and the second weld bead 38 and their thermally affected parts can be suppressed during welding and in cooling after welding. Thus, by defining the dimensions as ta<tb, weld quality is improved. The protruded portion 42 in the radial dimension of the ring gear 12 may be designed to be as small as possible to further reduce its heat capacity and to lower the rigidity.

Further, with the section modulus of the case joint portion 20 being increased, weld strength can be secured without making the penetration depth of the first weld bead 14 and the second weld bead 38 very large. Heat input during welding is thereby reduced. Thus, by making the dimensions ta<tb, weld distortion and welding equipment cost can be reduced.

Also, tb<tc as shown in FIG. 2. By making the dimension tb of the case joint portion 20 smaller, the weight of the ring gear 12 is reduced. Also, the case joint portion 20 has a smaller cross-sectional area, so that stirring resistance generated between lubricating oil (not shown) filling up around the ring gear 12 and the ring gear 12 when the ring gear 12 rotates around the center axis S in actual operation of the differential gear can be reduced.

Figure 4:
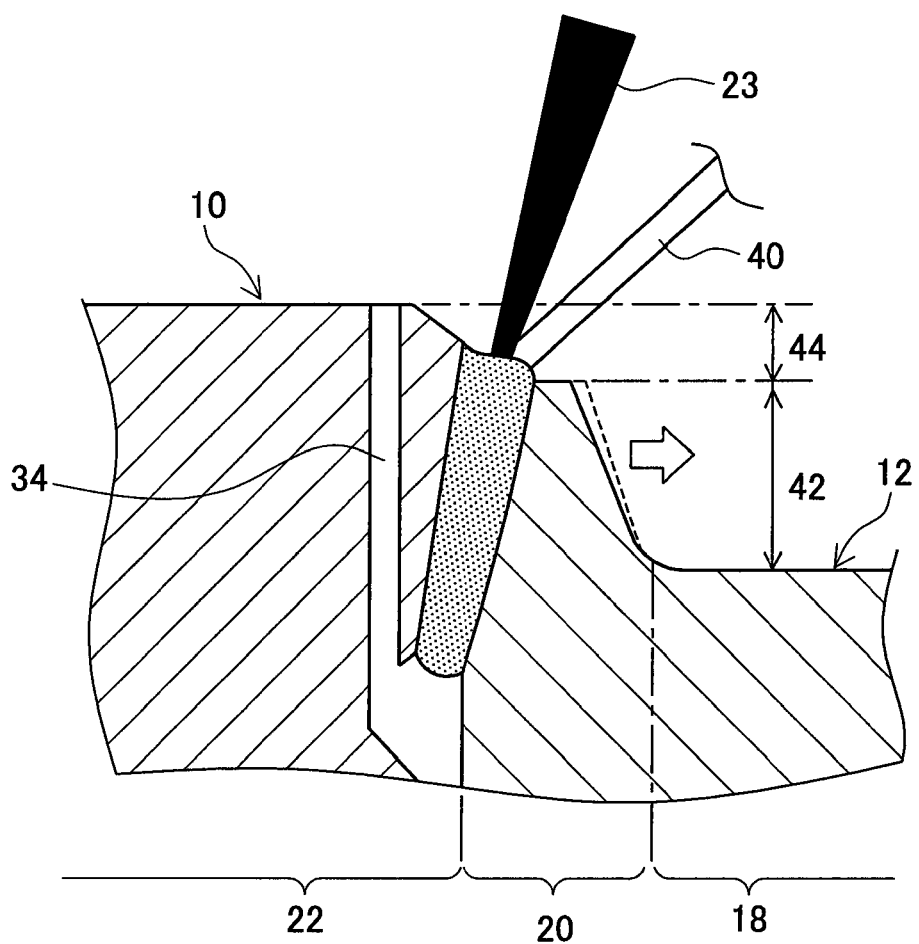
FIG. 4 is a view showing a state of a protruded portion during welding.

Also, as shown in FIG. 2 and FIG. 3, in the center axis S direction of the ring gear 12, the dimension between the end face 22a and the end face 22b of the gear joint portion 22 of the differential case 10 is denoted by td. In this example, tb<td. Thereby, a step 44 is each formed between the end face 20a of the case joint portion 20 of the ring gear 12 and the end face 22a of the gear joint portion 22 of the differential case 10, and between the end face 20b of the case joint portion 20 of the ring gear 12 and the end face 22b of the gear joint portion 22 of the differential case 10. Therefore, when welding the ring gear 12 and the differential case 10 together with their inner peripheral surface 12a and the abutment surface 21 abutted on each other, a weld wire 40 can be conformed (contacted) to the portions of these steps 44 as shown in FIG. 4 so that the weld wire 40 will not be displaced further toward the differential case 10. Thus, by making the dimensions tb<td, displacement of the weld wire 40 during welding can be prevented.

Figure 5:
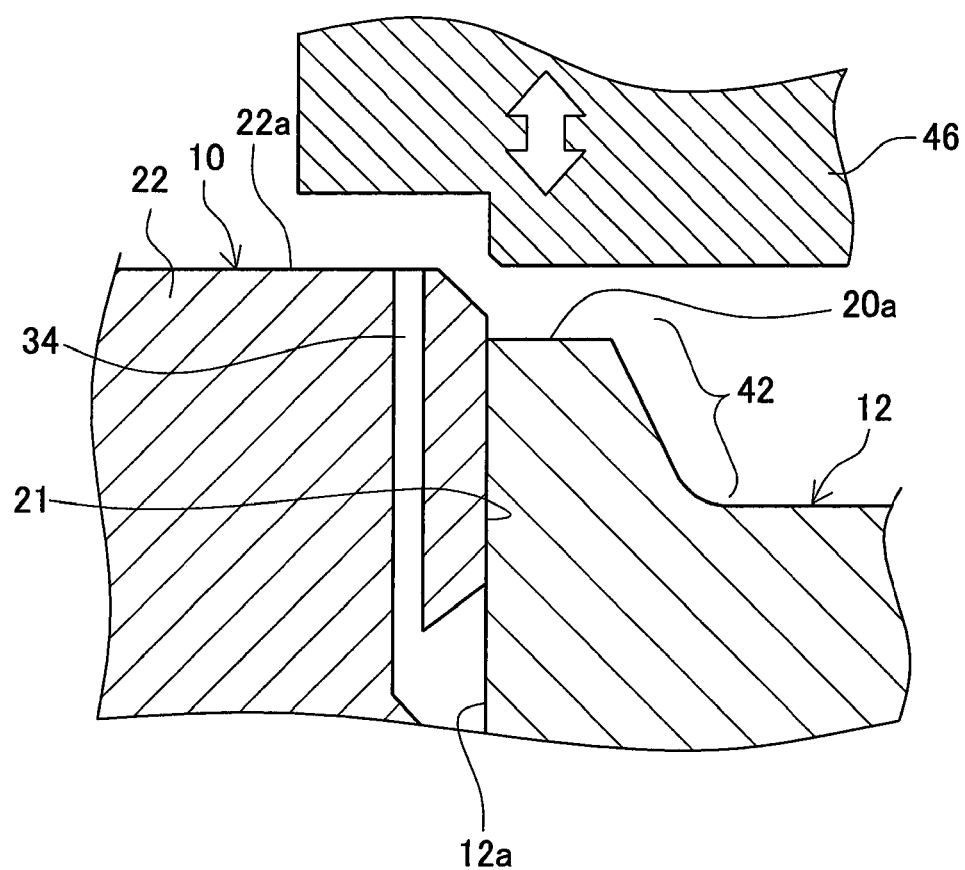
FIG. 5 is a view showing a state of positioning a ring gear by a positioning jig.

Further, as shown in FIG. 2 and FIG. 3, the end faces 20a and 20b of the case weld portion 20 of the ring gear 12 in the center axis S direction are formed flat along the radial direction of the ring gear 12. Therefore, the differential case 10 and the ring gear 12 can be accurately positioned by making a positioning jig 46 for the ring gear 12 abutted on one or both of the end faces 20a and 20b. FIG. 5 shows an example where the differential case 10 and the ring gear 12 are positioned by the positioning jig 46 abutted on the end face 20a. Either the end face 20a alone or the end face 20b alone may be formed flat along the radial direction of the ring gear 12. By forming at least one of the end faces 20a and 20b flat along the radial direction of the ring gear 12 in this manner, the differential case 10 and the ring gear 12 can be accurately positioned using the positioning jig 46.

As shown in FIG. 3, there are provided the first cavity 30 and the second cavity 32. Welding is performed such as to form the first weld bead 14 and the second weld bead 38 respectively between one end 27a of the joint surface 25 and the first cavity 30, and between one end 27b of the joint surface 25 and the second cavity 32 (hereinafter referred to as "piercing welding"). This allows the gas generated when the differential case 10 melts during welding to be exhausted into the first cavity 30 and the second cavity 32. Therefore, by such piercing welding with the first cavity 30 and the second cavity 32, formation of blow holes can be prevented. A tolerable amount of gas exhausted into the first cavity 30 and the second cavity 32 can be readily adjusted by adjusting the depth of the first groove 26 and the second groove 28.

Figure 6:
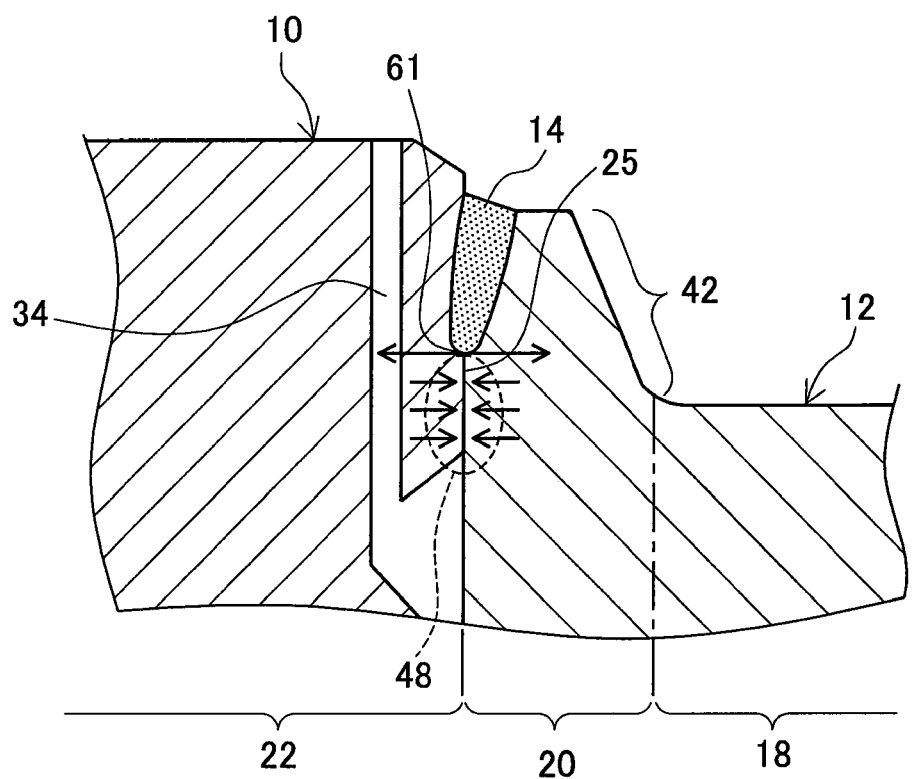
FIG. 6 is a view showing a state where compressive stress occurs in a non-welded portion.

Let us now assume a case where a non-welded portion 48 is provided between the first weld bead 14 and the first cavity 30. As shown in FIG. 6, as the first weld bead 14 and the surrounding thermally affected parts contract in cooling after welding, the non-welded portion 48 will inhibit the contraction in directions indicated by arrows, whereby there remains some tensile stress as indicated by arrows in the first weld bead interface 61. Such residual tensile stress may cause cracks to be readily formed from the first weld bead interface 61 when a load is applied thereto in actual operation of the differential gear. On the other hand, there will be no such risk with piercing welding with which the non-welded portion 48 is not formed as in this example. Accordingly, weld strength and weld quality are improved by the piercing welding with the first cavity 30 and the second cavity 32.

Also, as shown in FIG. 3, the press-fit portion 24 is provided to the abutment surface 21 of the gear joint portion 22 of the differential case 10. The joint portion 22 is inserted into the inner periphery of the ring gear 12 with the press-fit portion 24 press-fitted into the inner peripheral surface 12a of the ring gear 12. Therefore, the positional relationship between the differential case 10 and the ring gear 12 can be maintained before and after welding. Accordingly, weld distortion can be reduced by the provision of the press-fit portion 24.

Also, as shown in FIG. 2, the press-fit portion 24 is provided at a position beyond an irradiating target of a laser beam 23. Therefore, the laser beam 23 irradiated to form the first weld bead 14 and the second weld bead 38 impinges on and thus is intercepted by the press-fit portion 24. Accordingly, when forming a weld bead on one side after forming a weld bead on the other side (for example, when forming the second weld bead 38 after forming the first weld bead 14), there is no risk of re-heating the previously formed weld bead on one side with the laser beam for forming the weld bead on the other side. Thus, with the press-fit portion 24 being provided at a position beyond the irradiating target of the laser beam 23, weld strength and weld quality can be improved.

Even when laser beams 23 are simultaneously irradiated from two directions on both sides in the center axis S direction of the ring gear 12 to form the first weld bead 14 and the second weld bead 38, the laser beams 23 do not interfere with each other since the laser beams 23 from two directions impinge on and thus are interrupted by the press-fit portion 24. Accordingly, with the press-fit portion 24 being provided at the position beyond the irradiating target of the laser beam 23, safety in the welding equipment can be improved.

In this example, welding is performed from two directions on both sides in the center axis S direction of the ring gear 12 to form the first weld bead 14 and the second weld bead 38. Therefore, a molten component (such as Ni) of weld wire 40 is contained more in a portion with a smaller weld penetration depth than a portion with a larger weld penetration depth in each of the first weld bead 14 and the second weld bead 38, i.e., the distribution of the molten component of weld wire 40 in the weld penetration direction is almost equal between the first weld bead 14 and the second weld bead 38. Accordingly, the first weld bead 14 and the second weld bead 38 have a uniform material strength against bending stress applied thereto in actual operation of the differential gear. Thus, weld strength and weld quality can be improved by performing welding from two directions on both sides in the center axis S direction of the ring gear 12 to form the first weld bead 14 and the second weld bead 38.

Also, the distribution of heat input can be made uniform during welding along the center axis S direction of the ring gear 12 in portions where the first weld bead 14 and the second weld bead 38 will be formed. Therefore, weld distortion can be suppressed by performing welding from two directions on both sides in the center axis S direction of the ring gear 12.

As shown in FIG. 2 and FIG. 3, welding is performed to form the first weld bead 14 and the second weld bead 38 along directions inclined toward the ring gear 12 side at an angle a relative to the abutment surface 21 of the gear joint portion 22 of the differential case 10 (hereinafter referred to as "inclined welding"). Therefore, the melting amount of the differential case 10 (made of cast iron) that produces more gas when melted than the ring gear 12 (made of steel) during welding can be reduced, whereby the amount of generated gas can be reduced. Accordingly, formation of blow holes can be suppressed by performing the inclined welding.

Also, even in the event of a rupture of the first weld bead 14 and the second weld bead 38, the ring gear 12 will be caught in the differential case 10 and not come off, so that the ring gear 12 is prevented from dropping out.

Further, as shown in FIG. 2 and FIG. 3, the through holes 34 are provided in the differential case 10 to extend from outside into the first cavity 30. Therefore, by observing the reflection light of the laser beam 23 from the first groove 26 during welding through the through holes 34, it can be determined whether or not piercing welding has been successfully done wherein the first weld bead 14 is formed through to the first cavity 30. Accordingly, weld quality can certainly be improved by the provision of the through holes 34.

Gas accumulated inside the first cavity 30 escapes from the through holes 34 so that expansion of gas inside the first cavity 30 can hardly occur, whereby formation of pinholes in the first weld bead 14 can be prevented. Also, any water droplets generated by possible condensation inside the first cavity 30 in cooling after welding can be drained from the through holes 34, so that corrosion of the first weld bead 14 can be prevented. Thus, weld quality is improved by the provision of the through holes 34. Similar effects could be achieved with respect to the second weld bead 38 if through holes are provided in the differential case 10 to extend from outside into the second cavity 32.

Example 2

Figure 7:
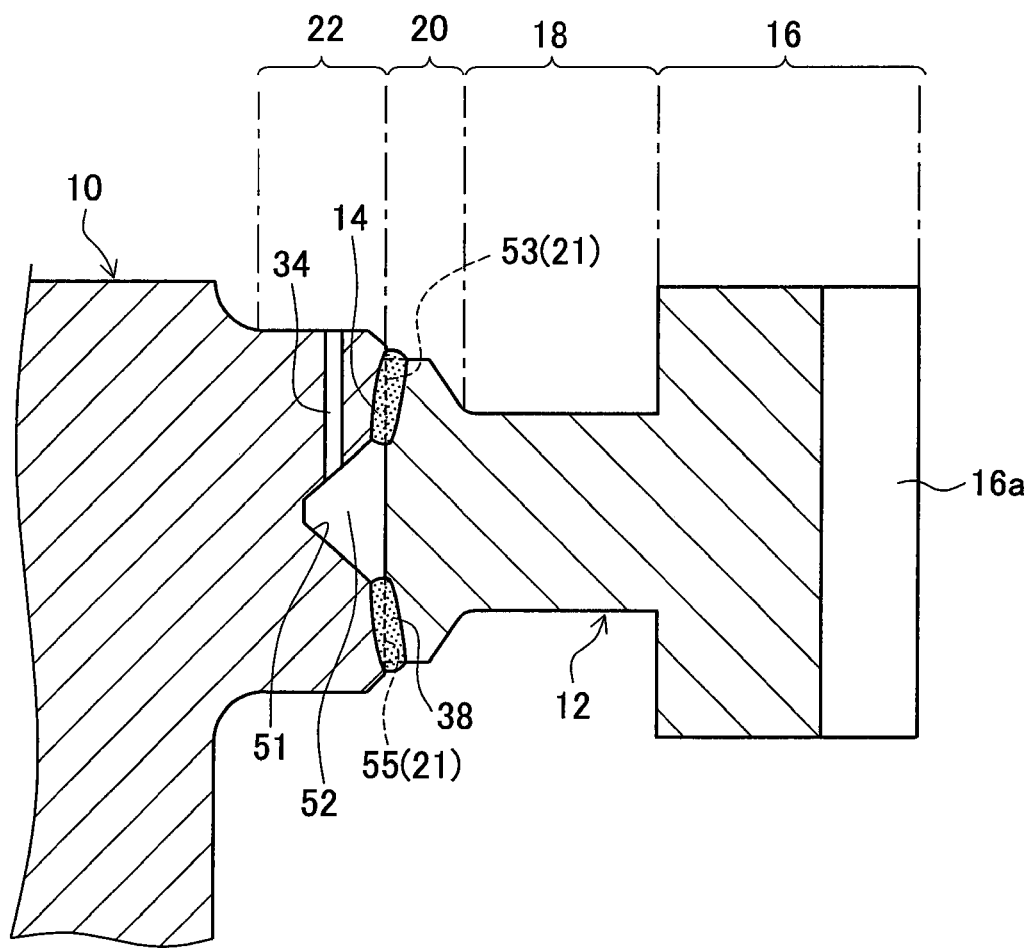
FIG. 7 is a view showing Example 2.

There could be Example 2 as shown in FIG. 7.

Example 2 is different from Example 1 in that no press-fit portion 24 is formed in the differential case 10. It is also different from Example 1 in that the differential case 10 is formed with a groove 51 in the abutment surface 21 so that it includes a cavity 52 formed between this groove 51 and the inner peripheral surface 12a of the ring gear 12. The cavity 52 has a larger cross-sectional area than the sum of cross-sectional areas of the first cavity 30 and the second cavity 32 of Example 1. Therefore, more gas that may be generated when the differential case 10 melts during welding can be exhausted into the cavity 52. Thus, according to Example 2, formation of blow holes can be more reliably suppressed because of the increased tolerable amount of gas that can be exhausted into the cavity 52. Also, because no press-fit portion 24 is provided, the number of mechanical machining processes is reduced, and the production cost can be reduced.

In Example 2, the gear joint portion 22 before welding is provided with abutment surfaces 53 and 55 on both sides of the groove 51 to be abutted against the case joint portion 20. When inserting the differential case 10 into the inner periphery of the ring gear 12 before welding, it is preferable to press fit the differential case 10 into the inner peripheral surface 12a of the ring gear 12 using at least one of the abutment surfaces 53 and 55.

There could also be a modified example where no through holes 34 are provided, if, due to the increased tolerable amount of gas that can be exhausted into the cavity 52, pin hole defects of the first weld bead 14 and the second weld bead 38 caused by expansion of gas inside the cavity 52 are unlikely to occur.

Example 3

Figure 8:
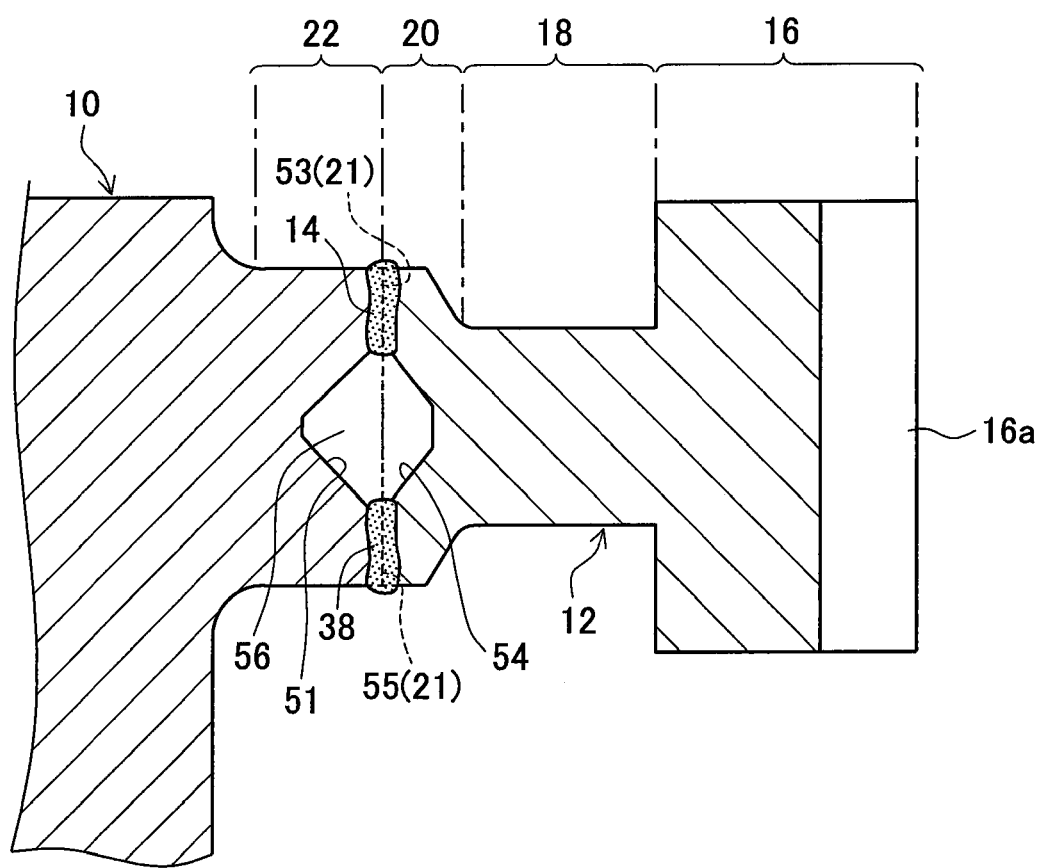
FIG. 8 is a view showing Example 3.

There could be Example 3 as shown in FIG. 8.

In Example 3, a groove 54 is provided in the inner peripheral surface 12a of the ring gear 12 in addition to the groove 51 in Example 2. Thus it includes a cavity 56 formed between the grooves 51 and 54. This cavity 56 has a larger cross-sectional area than that of the cavity 52 of Example 2. Therefore, more gas that may be generated when the differential case 10 melts during welding can be exhausted into the cavity 56. Thus, formation of blow holes can be even more reliably suppressed because of the increased tolerable amount of gas that can be exhausted into the cavity 56 by the provision of the groove 54 in the ring gear 12.

Because of the large tolerable amount of gas that can be exhausted into the cavity 56, pin hole defects caused by expansion of gas inside the cavity 56 are unlikely to occur in the first weld bead 14 and the second weld bead 38. Therefore, the necessity to provide the through holes extending from the cavity 56 to outside the differential case 10 is lowered.

As with Example 2, when inserting the differential case 10 into the inner periphery of the ring gear 12 before welding, it is preferable to press fit the differential case 10 into the inner peripheral surface 12a of the ring gear 12 using at least one of the abutment surfaces 53 and 55.

The previously described step 44 may be formed between the gear joint portion 22 and the case joint portion 20 as required. The inclined welding may also be performed.

Example 4

Figure 9:
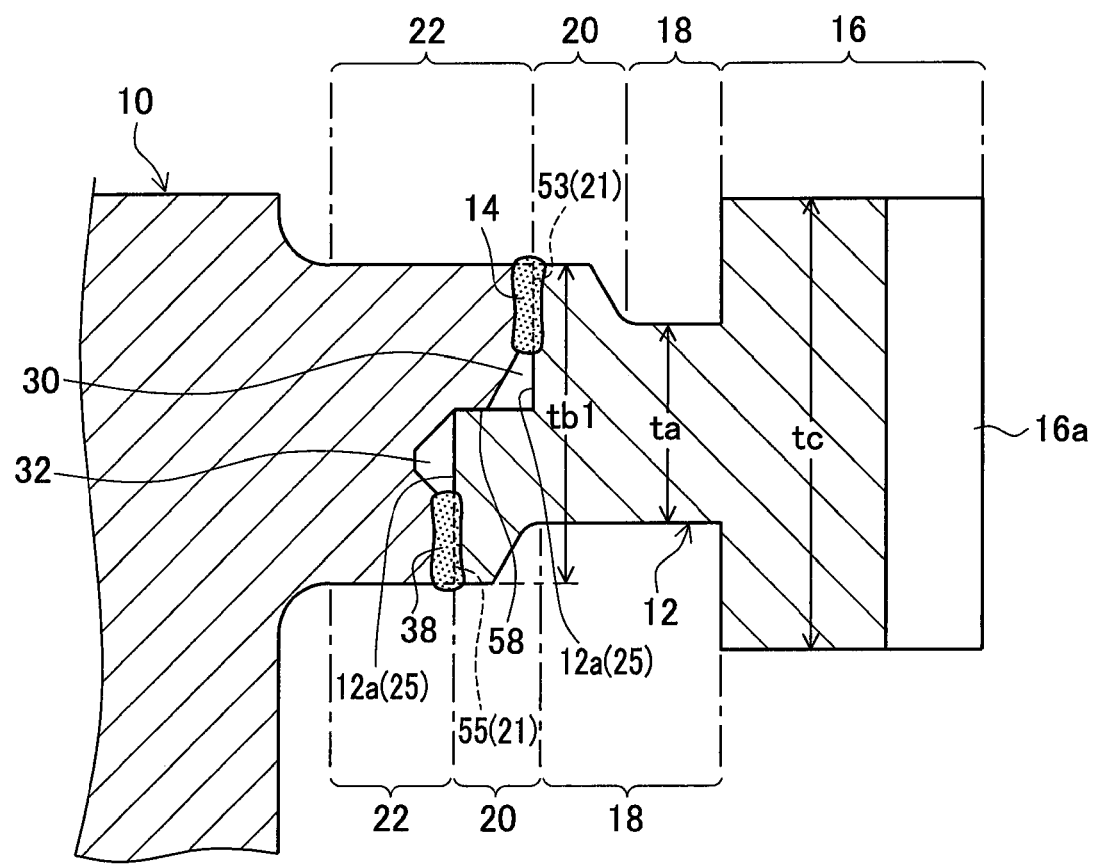
FIG. 9 is a view showing Example 4.

There could be Example 4 as shown in FIG. 9.

In Example 4, the inner peripheral surface 12a of the ring gear 12 is split into parts which are each positioned differently in the radial direction. In this example, the inner peripheral surface 12a forms the joint surface 25 where the case joint portion 20 and the gear joint portion 22 are joined together.

In aforementioned Examples 1 to 3, the direction of disposing the first weld bead 14 and the second weld bead 38 in the joint surface 25 (second direction) coincides with the direction orthogonally intersecting with the radial direction of the ring gear 12 (third direction, center axis S direction). In Examples 4 and 5 described below, in contrast, the direction of disposing the first weld bead 14 and the second weld bead 38 in the joint surface 25 (second direction) does not coincide with the direction orthogonally intersecting with the radial direction of the ring gear 12 (third direction, center axis S direction).

With the respective parts of the split inner peripheral surface 12a being at different positions in the radial direction, and with the abutment surfaces 53 and 55 of the differential case 10 matched with the positions of the inner peripheral surface 12a as shown in FIG. 9, the first weld bead 14 and the second weld bead 38 are each at different positions in the radial direction of the ring gear 12. Thereby, a laser beam 23 irradiated in the center axis S direction of the ring gear 12 during welding impinges on and is interrupted by the differential case 10 or the ring gear 12. Therefore, the laser beam 23 irradiated to form a weld bead on one side does not irradiate and re-heat the weld bead formed on the other side. Accordingly, weld strength and weld quality can be improved.

Even when the laser welding is performed simultaneously from two directions on both sides of the ring gear 12 in the center axis S direction, the laser beams 23 irradiated from two directions do not interfere with each other. Therefore, safety of the welding equipment is improved. Also, since there is no need to perform inclined welding, the welding equipment can be made simple and the production cost can be reduced.

In the event of a rupture of the first weld bead 14 and the second weld bead 38, the ring gear 12 will be caught in the differential case 10 and not come off, so that the ring gear 12 is prevented from dropping out.

Further, the differential case 10 and the ring gear 12 are butted against each other in the center axis S direction of the ring gear 12 at a butted portion 58. Thereby they have an increased strength against the thrust load.

In this example, ta<tb1, where tb1 represents the dimension of the case joint portion 20 of the ring gear 12 in the center axis S direction. Thereby, as with Examples 1 to 3, weld strength and weld quality between the differential case 10 and the ring gear 12 are improved, and weld distortion and welding equipment cost can be reduced.

By making the dimensions tb1<tc, as with Examples 1 to 3, the ring gear 12 can be made more lightweight, and stirring resistance can be reduced.

As with Examples 2 and 3, when inserting the differential case 10 into the inner periphery of the ring gear 12 before welding, it is preferable to press fit the differential case 10 into the inner peripheral surface 12a of the ring gear 12 using at least one of the abutment surfaces 53 and 55.

Depending on the needs, through holes extending from the first cavity 30 to outside or through holes extending from the second cavity 32 to outside may also be provided in the differential case 10. Also, the previously described step 44 may be provided between the gear joint portion 22 and the case joint portion 20 as required.

Example 5

Figure 10:
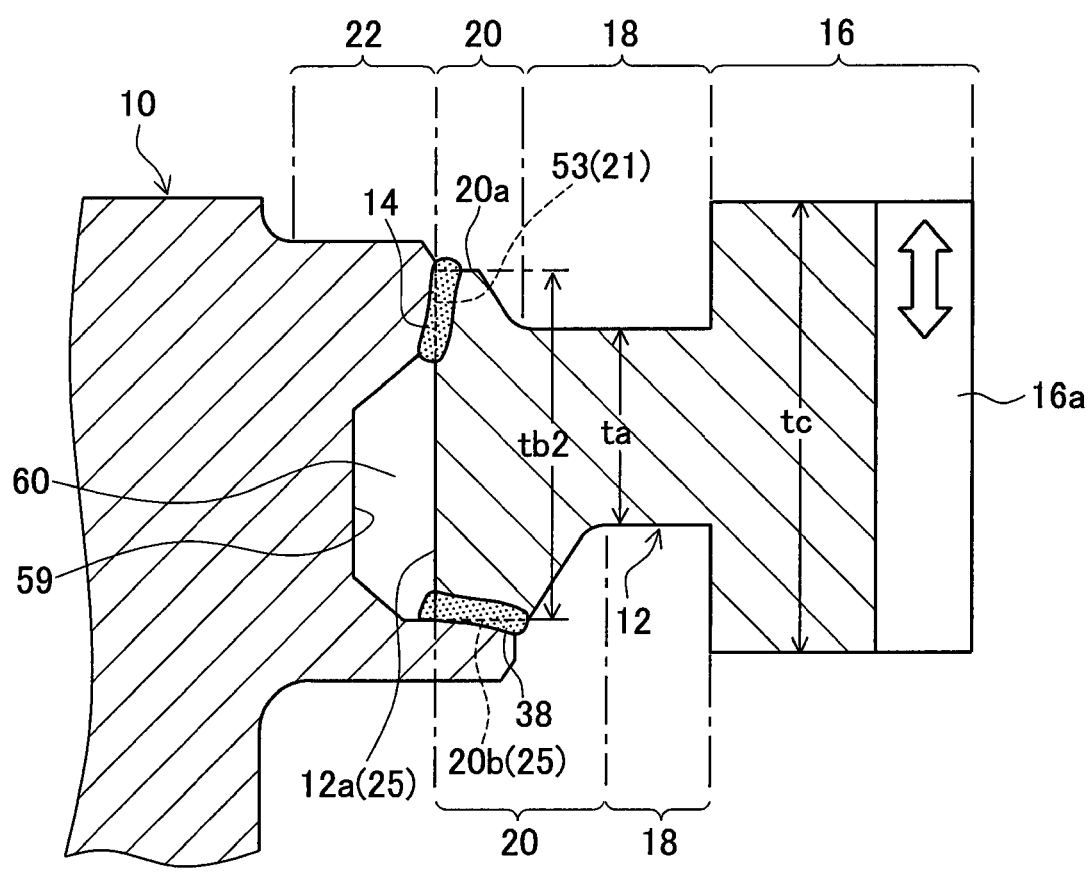
FIG. 10 is a view showing Example 5.
Figure 11:
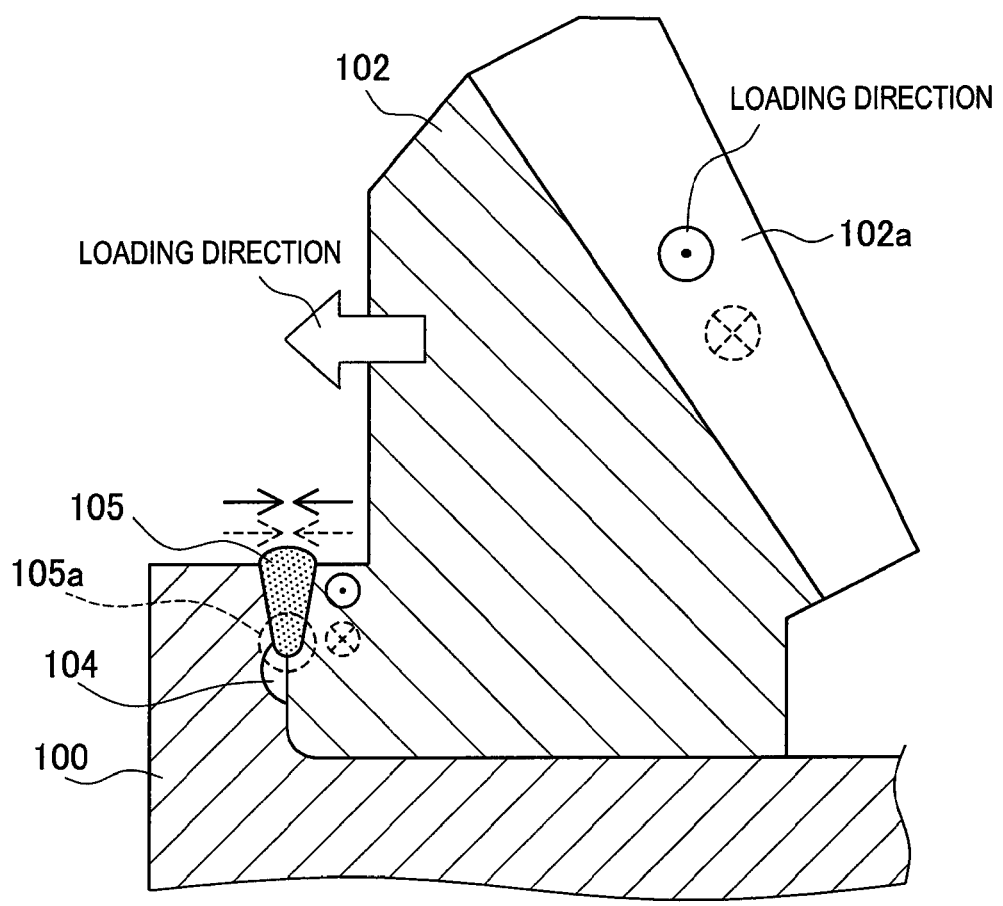
FIG. 11 is a view showing a conventional example using a ring gear of a hypoid gear.
Figure 12:
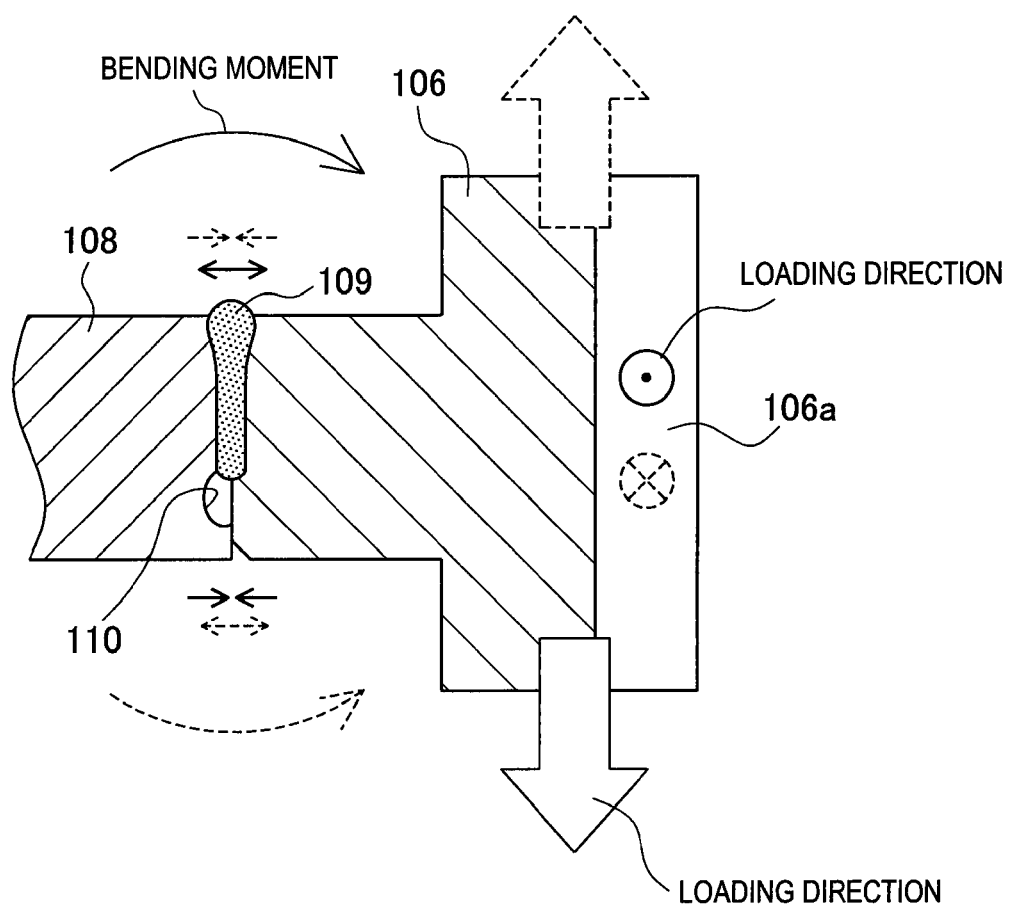
FIG. 12 is a view showing a conventional example using a ring gear of a helical gear.

There could be Example 5 as shown in FIG. 10.

In Example 5, the joint surface 25 where the case joint portion 20 and the gear joint portion 22 are joined together consists of a surface formed by the inner peripheral surface 12a of the ring gear 12 and the end face 20b of the case joint portion 20 (a surface formed by connecting a plurality of surfaces oriented in different directions). The second weld bead 38 is formed along the end face 20b of the case joint portion 20 so that the second weld bead 38 is formed substantially in the radial direction of the ring gear 12. Thereby, weld strength is improved even when, for example, a thrust load is unevenly applied to the upper side in the drawing as shown in FIG. 10 of the toothed portion 16 by power transmission from the drive pinion (not shown) in actual operation of the differential gear.

In the case where such bending stress as described above is unevenly applied to the lower side of the drawing, weld strength may be improved by inverting the directions in which the first weld bead 14 and the second weld bead 38 are formed from those of the example of FIG. 10.

Also, the laser beam 23 irradiated to form a weld bead on one side does not re-heat the weld bead already formed on the other side during welding. Accordingly, weld quality can be improved. Moreover, even when the laser welding is performed from two directions on both sides of the ring gear 12 in the center axis S direction, the laser beams 23 irradiated from two directions do not interfere with each other. Therefore, safety of the welding equipment can be improved.

In this example, ta<tb2, where tb2 represents the dimension of the case joint portion 20 of the ring gear 12 in the center axis S direction. Thereby, as with Examples 1 to 4, weld strength and weld quality between the differential case 10 and the ring gear 12 are improved, and weld distortion and welding equipment cost can be reduced.

By making the dimensions tb2<tc, as with Examples 1 to 4, the ring gear 12 can be made more lightweight, and stirring resistance can be reduced.

When inserting the differential case 10 into the inner periphery of the ring gear 12 before welding, it is preferable to press fit the differential case 10 into the inner peripheral surface 12a of the ring gear 12 using the abutment surface 53.

A cavity 60 is formed between a groove 59 formed in the abutment surface 21 and the inner peripheral surface 12a. Depending on the needs, through holes extending from this cavity 60 to outside may be formed in the differential case 10.

It will be appreciated that the foregoing embodiments are given for illustrative purposes only and not to be construed as limiting the present invention, but can be implemented with various improvements and modifications without departing from the scope of the subject matter of the invention.

While the welded structure between a differential case and a ring gear of a differential gear is described in the foregoing Examples, the present invention is not limited to those examples. For instance, the invention is applicable to a welded structure between an annular part and a component inserted into the inner peripheral surface of the annular part, the part and the component being different from the differential case and the ring gear, or to a welded structure between bar-like members or plate-like members.

As long as the weight of the ring gear 12 and the stirring resistance between the ring gear 12 and lubricating oil (not shown) when the ring gear 12 rotates fall within permissible ranges, the dimension tb of the case joint portion 20 of the ring gear 12 in the center axis S direction may be made larger than the dimension tc of the toothed portion 16 (tb>tc).

DESCRIPTION OF THE REFERENCE SIGNS

10 Differential case
12 Ring gear
12a Inner peripheral surface
14 First weld bead
16 Toothed portion
16a Teeth portion
18 Connecting portion
20 Case joint portion
20a End face
20b End face
21 Abutment surface
22 Gear joint portion
22a End face
22b End face
23 Laser beam
24 Press-fit portion
25 Joint surface
27a End
27b End
30 First cavity
32 Second cavity
34 Through hole
38 Second weld bead
40 Weld wire
42 Protruded portion
44 Step
46 Positioning jig
52 Cavity
53 Abutment surface
55 Abutment surface
56 Cavity
60 Cavity
61 First weld bead interface
α Angle
S Center axis

The invention claimed is:

1. A welded structure of a first member and a second member joined together by welding,
   wherein the first member includes a second-member joint portion joined to the second member,
   wherein the second member includes a first-member joint portion joined to the first member,
   wherein when the first member and the second member are arranged in a first direction, and a second direction intersects with the first direction,
   a) two welds are formed separated from each other at both ends in the second direction of a joint surface where the first-member joint portion and the second-member joint portion are joined together,
   b) the first member includes the second-member joint portion and a connecting portion connected to the second-member joint portion, arranged sequentially from the joint surface along the first direction,
   c) the second-member joint portion is formed to have a larger size than that of the connecting portion in a third direction orthogonal to the first direction, and
   d) the first member is an annular member with its radial direction coinciding with the first direction and its center axis direction coinciding with the third direction.

2. The welded structure according to claim 1, wherein an external force is applied to the first member or the second member in a direction parallel to the third direction.

3. The welded structure according to claim 1, wherein the second-member joint portion has a smaller size than that of the first-member joint portion in the third direction.

4. The welded structure according to claim 1, wherein at least one of both end faces of the second-member joint portion in the third direction is formed flat along the first direction.

5. The welded structure according to claim 1,
   wherein the welded structure includes a cavity between the first-member joint portion and the second-member joint portion, and
   the welds are provided respectively between both ends of the joint surface in the second direction and the cavity.

6. The welded structure according to claim 5, wherein the first member or the second member includes a through hole extending from outside into the cavity.

7. The welded structure according to claim 1,
   wherein the second member is made of a material that generates more gas when the second member is melted than the first member, and
   the welds are each formed along a direction inclined toward the first member side relative to the joint surface.

8. The welded structure according to claim 1, wherein the first member includes a non-joint portion connected to an outer circumference of the connecting portion in the radial direction, the second-member joint portion having a smaller size than that of the non-joint portion in the center axis direction.

9. The welded structure according to claim 1, wherein a press-fit portion is formed on one of an inner peripheral surface of the first member and an abutment surface of the first-member joint portion of the second member that abuts against the inner peripheral surface for allowing a press-fit to be made with an allowance between the inner peripheral surface and the abutment surface.

10. The welded structure according to claim 1,
    wherein the first member is a ring gear of a differential gear, and
    the second member is a differential case that is a housing member of the differential gear.

11. A welding method for joining a first member and a second member together by welding, wherein when the first member and the second member are arranged along a first direction for joining together a second-member joint portion of the first member to be joined to the second member and a first-member joint portion of the second member to be joined to the first member, and a second direction intersects with the first direction, a) the first member is formed to have the second-member joint portion and a connecting portion connected to the second-member joint portion arranged sequentially from a joint surface where the first-member joint portion and the second-member joint portion are joined together along the first direction, with the second-member joint portion having a larger size than that of the connecting portion in a third direction orthogonal to the first direction, b) welding is performed from both ends of the joint surface in the second direction to form two welds separated from each other at both ends of the joint surface in the second direction, and c) the first member is an annular member with its radial direction coinciding with the first direction and its center axis direction coinciding with the third direction.

12. The welding method according to claim 11, wherein the second-member joint portion has a smaller size than that of the first-member joint portion in the third direction so that a step is formed between the first-member joint portion and the second-member joint portion, and welding is performed with weld wire being fed to conform to the step.

13. The welding method according to claim 11, wherein at least one of both end faces of the second-member joint portion in the third direction is formed flat along the first direction, and positioning of the first member is performed by abutting a jig on the end face formed flat.

* * * * *